(12) United States Patent
Kadar-Kallen (10) Patent No.: US 8,403,538 B2
(45) Date of Patent: Mar. 26, 2013

(54) COLOR HOMOGENIZING OPTICAL ASSEMBLY

(75) Inventor: Michael Aaron Kadar-Kallen, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 454 days.

(21) Appl. No.: 12/241,943

(22) Filed: Sep. 30, 2008

(65) Prior Publication Data

US 2010/0080002 A1  Apr. 1, 2010

(51) Int. Cl.
*F21V 7/00* (2006.01)
(52) U.S. Cl. ......... 362/309; 362/268; 362/293; 362/327
(58) Field of Classification Search ................. 362/268, 362/296.01, 307–309, 311.11, 311.14, 240, 362/241, 297, 326–329, 331–340, 293; 359/619–628
See application file for complete search history.

(56) References Cited

U.S. PATENT DOCUMENTS

| | | | | |
|---|---|---|---|---|
| 4,374,609 A * | 2/1983 | Lange | | 359/455 |
| 4,425,501 A * | 1/1984 | Stauffer | | 250/216 |
| 4,654,761 A * | 3/1987 | Walsh | | 362/521 |
| 4,752,116 A * | 6/1988 | Sekiguchi | | 359/457 |
| 4,942,425 A * | 7/1990 | Kamimura et al. | | 355/45 |
| 5,218,480 A | 6/1993 | Moskovich | | |
| 5,400,133 A * | 3/1995 | Hinton et al. | | 356/138 |
| 5,416,573 A | 5/1995 | Sartor, Jr. | | |
| 5,649,753 A * | 7/1997 | Masumoto | | 353/102 |
| 5,731,899 A * | 3/1998 | Meyers | | 359/621 |
| 5,833,355 A | 11/1998 | You et al. | | |
| 6,280,035 B1 | 8/2001 | Tadic-Galeb et al. | | |
| 6,443,594 B1 | 9/2002 | Marshall et al. | | |
| 6,646,793 B2 | 11/2003 | Bruesselbach et al. | | |
| 6,746,124 B2 | 6/2004 | Fischer et al. | | |
| 7,077,525 B2 | 7/2006 | Fischer et al. | | |
| 7,106,936 B2 | 9/2006 | Saccomanno | | |
| 7,159,997 B2 | 1/2007 | Reo et al. | | |
| 7,344,902 B2 | 3/2008 | Basin et al. | | |
| 7,533,994 B2 * | 5/2009 | Heeman et al. | | 353/38 |
| 2002/0054434 A1 * | 5/2002 | Florczak et al. | | 359/619 |
| 2005/0128595 A1 * | 6/2005 | Shimizu | | 359/619 |
| 2006/0146531 A1 | 7/2006 | Reo et al. | | |
| 2006/0146540 A1 | 7/2006 | Reo et al. | | |
| 2006/0262411 A1 * | 11/2006 | Dunn et al. | | 359/619 |
| 2007/0047036 A1 * | 3/2007 | Kinoshita | | 358/533 |
| 2007/0076427 A1 | 4/2007 | Reo et al. | | |
| 2007/0147041 A1 * | 6/2007 | Shiratsuchi et al. | | 362/268 |
| 2007/0182939 A1 * | 8/2007 | Huibers et al. | | 353/84 |
| 2007/0253197 A1 * | 11/2007 | Kung et al. | | 362/231 |
| 2007/0295891 A1 * | 12/2007 | Wang et al. | | 250/221 |
| 2008/0048200 A1 * | 2/2008 | Mueller et al. | | 257/98 |
| 2008/0117278 A1 * | 5/2008 | Oehlbeck et al. | | 347/232 |
| 2008/0117491 A1 * | 5/2008 | Robinson | | 359/237 |

(Continued)

OTHER PUBLICATIONS

J. Brandrup, E.H. Immergut, and E.A. Grulke, Polymer Handbook, Fourth Edition (John Wiley & Sons, Inc. 1999) at p. VI/578, Table 3.*

(Continued)

*Primary Examiner* — John A Ward (57) ABSTRACT

An optical assembly includes a light source and an optical element. The light source generates light where the color of the light varies based on the direction the light is emitted from the light source. The optical element is positioned transverse to the optical axis and is configured to mix the light. The color of the light mixed by the optical element is substantially independent of the direction at which the light emanates from the optical element.

14 Claims, 10 Drawing Sheets

U.S. PATENT DOCUMENTS

| | | | |
|---|---|---|---|
| 2008/0130126 A1* | 6/2008 | Brooks et al. | 359/619 |
| 2008/0165423 A1* | 7/2008 | Steenblik et al. | 359/626 |
| 2009/0283794 A1 | 11/2009 | Mizuno et al. | |
| 2010/0033829 A1* | 2/2010 | Wippermann et al. | 359/623 |
| 2010/0231862 A1* | 9/2010 | Itoh et al. | 353/31 |
| 2010/0277805 A1* | 11/2010 | Schilling et al. | 359/619 |
| 2011/0035977 A1* | 2/2011 | Wilson et al. | 40/582 |

OTHER PUBLICATIONS

E.H. Smith, Mechanical Engineer's Reference Book, 12th Edition (Elsevier 2003) at p. 7/121, Table 7.61.*

Customer Drawing, Carclo Technical Plastics, © 2007 Carclo all Dimensions In mm.

Dialight Lumidrives Optic Development Kits, www.dialight.com, 8 pgs.

Energy Star® Program Requirements for Solid State Lighting Luminaires, Final Draft Sep. 12, 2007, 22 pgs.

FC Lens series for Cree XLamp® 7090 XR and XR-E LEDs. www.fraensrl.com, 8 pgs.

Solderless High Intensity LED Holder, Tyco Electronics, 4 pgs.

* cited by examiner

COLOR HOMOGENIZING OPTICAL ASSEMBLY

BACKGROUND OF THE INVENTION

The subject matter herein generally relates to optical assemblies and, more particularly, to optical assemblies having a light source and one or more lenses.

Many known light sources emit light that, on average, appears to be of a single color. For example, some known light emitting diodes ("LEDs") emit light that is, on average, of a white color. The color of the emitted light, however, can slightly vary based on the direction that the light emanates from the LEDs. For example, an LED may emit a light that does not have an even distribution of color and appears unattractive or artificial. The direction at which light emanates from the LED may be defined as an azimuth angle and a zenith angle. The zenith angle is the angle between the direction and the optical axis of the light and the azimuth angle is the angle of the direction measured in a plane that is perpendicular to the optical axis of the light.

Known industry standards require that the color of light emitted by a light source be approximately constant across a range of azimuth and/or zenith angles. For example, the Energy Star® program issued Requirements for Solid State Lighting Luminaires, Eligibility Criteria—Version 1.0. These Requirements include minimum criteria for color spatial uniformity, or criteria for the uniformity of the color of light across a range of azimuth and/or zenith angles. Other industry standards and criteria may include additional criteria on the color uniformity of light emitted by a light source. Many known light sources do not satisfy industry standards and criteria relevant to the color of light emitted by the light sources.

Thus, a need exists for improving the color uniformity of light emitted by a light source. For example, a need exists for decreasing the dependence of the color of the light on the direction at which the light emanates from the light source.

BRIEF DESCRIPTION OF THE INVENTION

In one embodiment, an optical assembly includes a light source and an optical element. The light source generates light where the color of the light varies based on a direction the light is emitted from the light source. The optical element is positioned transverse to the optical axis and is configured to mix the light. The color of the light mixed by the optical element is substantially independent of the direction at which the light emanates from the optical element.

In another embodiment, an optical assembly includes a light source, a collimating lens and a plurality of deflecting lenses. The light source generates light in an angular emission pattern relative to an optical axis of the light source. The color of the light in the angular emission pattern varies based on the direction the light is emitted from the light source. The collimating lens receives the light from the angular emission pattern and collimates the light into a spatial pattern in a plane transverse to the optical axis. The deflecting lenses are arranged in an array in a plane transverse to the optical axis. Each of the deflecting lenses receives a portion of the light in the spatial pattern. The deflecting lenses mix the light into an illumination pattern that emanates from the deflecting lenses. The color of the light in the illumination pattern is substantially independent of the direction the light emanates from the deflecting lenses.

In another embodiment, an optical assembly includes a light source, a reflector and an optical element. The light source is generates light having a color that is dependent on the direction the light is emitted from the light source. The reflector is configured to reflect at least some of the light generated by the light source. The optical element is configured to receive and mix the light generated by the light source such the color of the light emanating from the optical element is substantially independent of the direction the light emanates from the optical element.

DETAILED DESCRIPTION OF THE INVENTION

Figure 1:
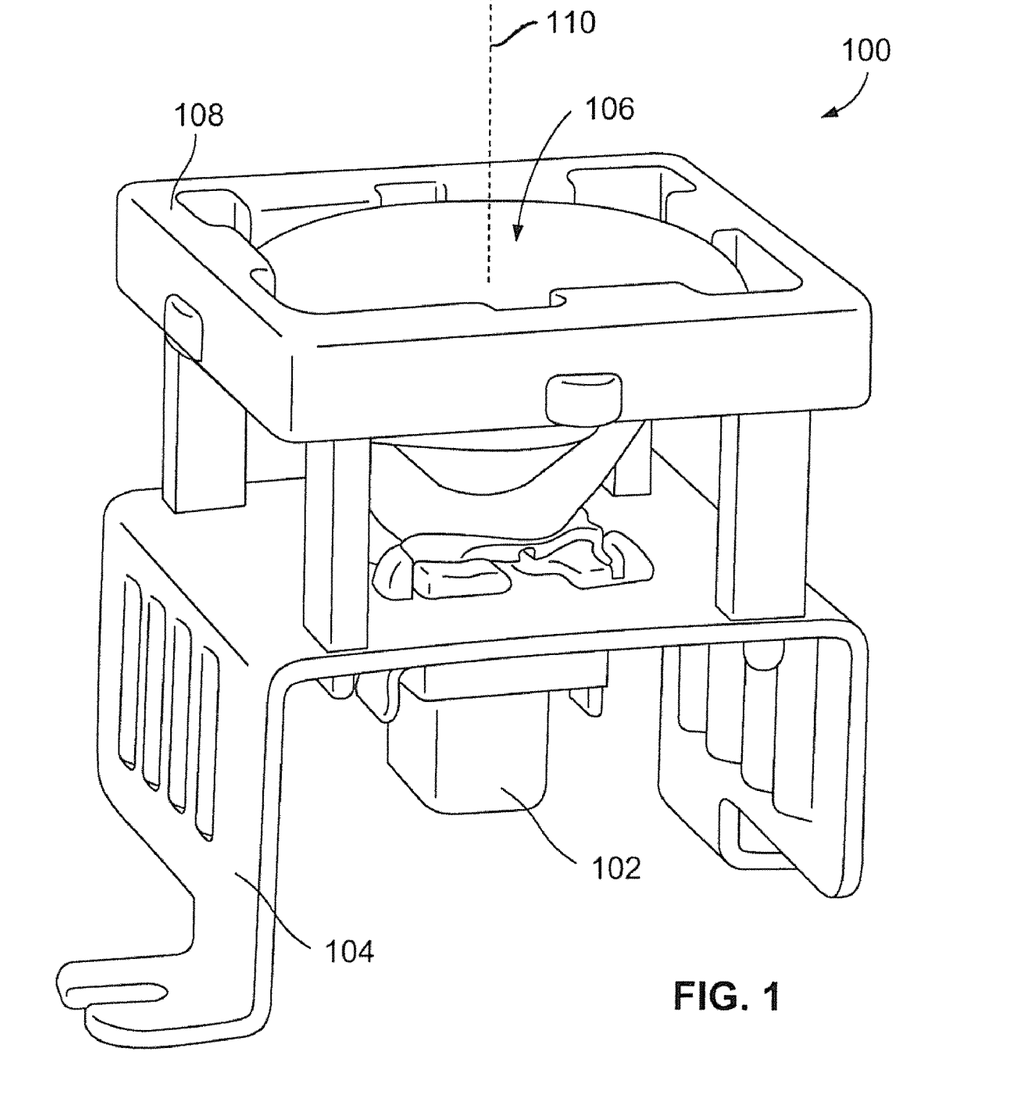
FIG. 1 is a perspective view of a color homogenizing optical assembly according to one embodiment.

FIG. 1 is a perspective view of a color homogenizing optical assembly 100 according to one embodiment. The optical assembly 100 includes a light source 200 (shown in FIG. 2) that is supported by a carrier sub-assembly 102. The light source 200 may be held between the carrier sub-assembly 102 and the optical element 106. The carrier sub-assembly 102 is coupled with a heat sink 104. The heat sink 104 dissipates thermal energy generated by the light source 200. A color homogenizing optical element 106 is held above the light source 200 by an optical element holder 108. As described below, the optical element 106 receives light generated by the light source 200 and deflects the light in a desired manner when passing through the optical assembly 100 relative to an optical axis 110. In one embodiment, the optical assembly 100 may be used in a variety of applications to smooth out or otherwise mix an initial distribution of colors in light emitted by the light source 200 such that the color of the light emanating from the optical element 106 is approximately uniform, or is approximately independent of the direction at which the light emanates from the optical assembly 100.

Figure 2:
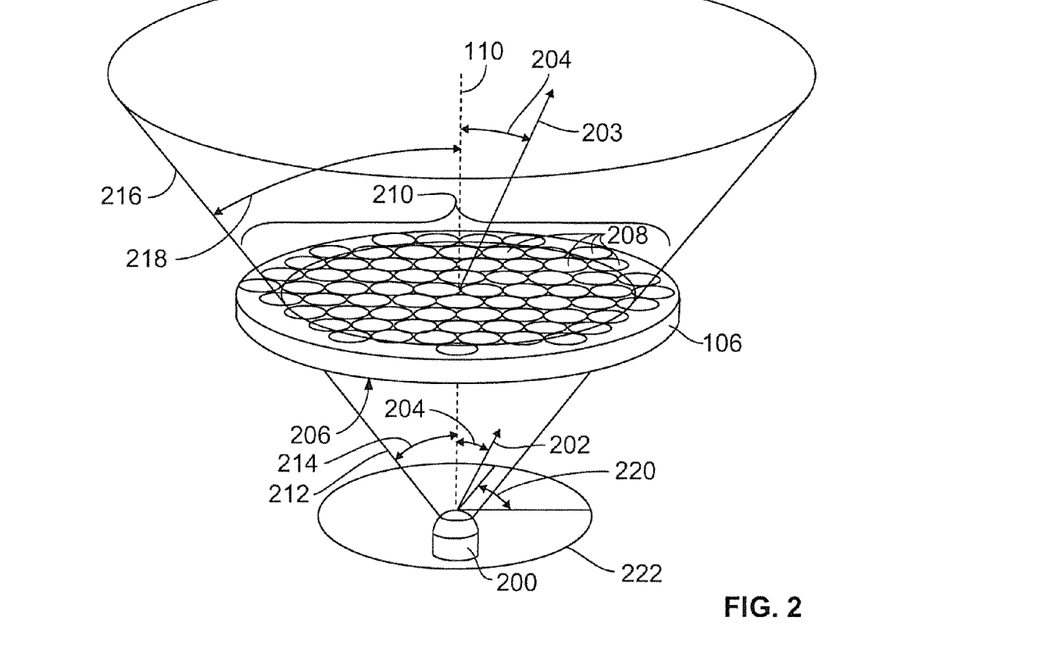
FIG. 2 is a schematic illustration of a light source and an optical element of the optical assembly shown in FIG. 1 according to one embodiment.

FIG. 2 is a schematic illustration of the light source 200 and the optical element 106 of the optical assembly 100 shown in FIG. 1 formed according to one embodiment. FIG. 2 includes an idealized representation of the components described herein. The actual relationship and distribution of the various components with respect to one another may vary slightly while keeping within the scope of one or more embodiments described herein. For example, while the light emitted by the light source 200 may not be emitted in an exact cone (such as cone 212) as shown in FIG. 2, the actual distribution of the light emitted from the light source 200 may approximate the distribution shown in FIG. 2. The idealized representation shown in FIG. 2 is provided to illustrate and not to limit the scope of embodiments of the presently described invention. The representations described herein may be applied to systems, apparatuses, devices, and the like, designed using optical modeling software, with the idealized representations shown and described in the original embodiments used as a starting point of the design The light source 200 may be embodied in a device, system, apparatus or assembly that emits light generally in a direction along the optical axis 110. In one embodiment, the light source 200 is one or more LEDs. Alternatively, the light source 200 includes one or more other sources of light. The light source 200 emits light generally in the direction of the optical axis 110. The optical axis 110 represents a direction in which the optical assembly 100 is intended to distribute light. For example, the optical axis 110 may be directed toward a target (not shown) that the light is to illuminate. In another example, the optical axis 110 represents a center of the distribution of light emitted by the light source 200. Alternatively, the optical axis 110 represents an axis about which the optical assembly 100 is symmetric. The light source 200 may emit light in a variety of other directions. For example, the light source 200 may emit light in a variety of directions that are not generally along the optical axis 110. In the illustrated embodiment, the light source 200 emits light in a variety of directions, within an emitted cone 212. The zenith angle 204 is measured relative to the optical axis 110. The emitted cone angle 214 is the zenith angle 204 at which the intensity of the emitted light is at least 50% of the maximum intensity of the emitted light in one embodiment. Alternatively, the emitted cone angle 214 represents the zenith angle 204 within which at which at least 90% of the total energy of the emitted light is directed. In another example, the emitted cone angle 214 represents the zenith angle 204 within which at which at least a different minimum percentage of the total energy of the emitted light is directed. The minimum percentage may be 80%, 70%, 50%, and the like. While a single light source 200 and optical element 106 are shown in FIG. 2, in another embodiment a plurality of light sources 200 may emit light toward a single optical element 106. Alternatively, a single light source 200 may emit light toward a plurality of optical elements 106.

The light generated by the light source 200 includes a plurality of colors. While the predominant color of the light generated by the light source 200 may be a single color, the color of the light may slightly vary based on a direction 202 of the emitted light relative to the optical axis 110. For example, while the light source 200 may emit a predominantly white light, the actual color of the light emitted at different directions 202 may be slightly different. The direction 202 of the light may be defined by a zenith angle 204 and an azimuth angle 220. The azimuth angle 220 is measured in a plane 222 that is perpendicular to the optical axis 110. In one embodiment, the light emitted by the light source 200 is, on average, a white light that has an angular emission pattern 804 (shown in FIG. 8) in which the color of the light is a function of the direction 202 at which the light is emitted from the light source 200, as described below. Alternatively, the light emitted by the light source 200 is, on average, a color other than a white light.

The optical element 106 includes a collimating lens 206 and a plurality of deflecting lenses 208. One or more of the collimating lens 206 and the lenses 208 may include refractive lenses and diffractive lenses. A refractive lens may consist of spherical or aspherical surfaces, or may be Fresnel lens. The collimating lens 206 and the lenses 208 may be homogeneously formed into a unitary body. For example, the collimating lens 206 and the lenses 208 may be molded into a common block of a light-transmissive material such as a plastic or glass. In one embodiment, one or more of the collimating lens 206 and the lenses 208 are etched into a material such as fused silica using gray-scale photolithography. In another embodiment, the collimating lens 206 is formed as a lower surface of the optical element 106. Alternatively, the collimating lens 206 and the lenses 208 may be separately formed from one another or formed as mechanically separate bodies or components of the optical element 106. For example, the collimating lens 206 and the lenses 208 may be separated by a distance. The optical element 106 can be a diffractive optical element that includes the functions of both the collimating lens 206 and the lenses 208 formed on a single surface on either side of the optical element 106. While the optical element 106 is illustrated as a planar body having a circular shape in a plane perpendicular to the optical axis 110, the optical element 106 may have a different shaped body and/or shape. For example, the optical element 106 may have a rounded non-planar body such as a convex body. In another example, the optical element 106 may be in the shape of a polygon.

The collimating lens 206 is disposed on the side of the optical element 106 that is proximate to the light source 200 while the lenses 208 are disposed on the opposite side of the optical element 106 remote from the optical element 106. For example, the collimating lens 206 is positioned between the lenses 208 and the light source 200. The lenses 208 are arranged in an array 210 distributed across a plane oriented transverse to the optical axis 110. For example, the lenses 208 may be distributed in a plane that is not parallel to the optical axis 110. This plane may be approximately perpendicular to the optical axis 110. The array 210 includes a regular, or repeated, pattern of the lenses 208 arranged oh a side of the optical element 106 that opposes the collimating lens 206. Alternatively, the lenses 208 may not be arranged in the array 210. For example, one or more of the lenses 208 may be randomly positioned with respect to one or more other lenses 208. The number of lenses 208 shown in FIG. 2 is provided merely for illustration and is not intended to limit any embodiments described herein. For example, a different number of the lenses 208 may be provided.

The light generated by the light source 200 diverges along a pattern bounded by the emitted cone 212 until impinging upon the optical element 106. The light is collimated by the collimating lens 206 in the optical element 106. For example, the light is deflected by the collimating lens 206 so that the light is predominantly directed in a direction parallel to the optical axis. The light is then deflected by the lenses 208 of the optical element 106. The light may emanate from the optical element 106 predominantly within an illumination cone 216. The illumination cone 216 may be approximately centered about the optical axis 110. In the illustrated embodiment, the illumination cone angle 218 is defined in a manner similar to the emission cone angle 214. The illumination cone angle 218 is the approximately the same as the emission cone angle 214 in one embodiment. Alternatively, the illumination cone angle 218 may be greater or less than the emission cone angle 214 in alternative embodiments.

As described in more detail below, the lenses 208 distribute the light an illumination pattern. The lenses 208 mix the different colors of the light so that the color of the light is substantially uniform across a range of directions 203 at which the light emanates from the optical element 106. For example, while the light generated by the light source 200 may appear to be of a different color at different directions 202 at which the light is emitted from the light source 200, the color of the light emanating from the optical element 106 is substantially independent of the direction 203 of the light.

Figure 3:
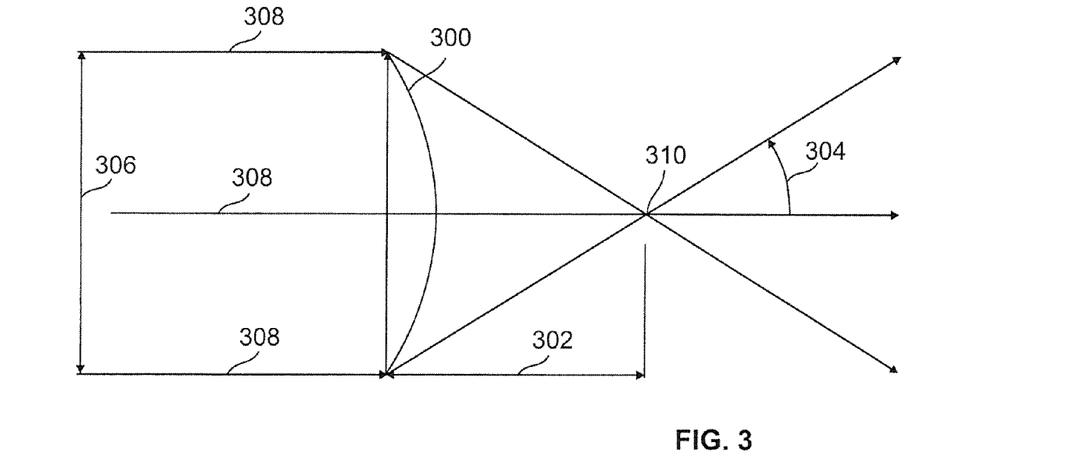
FIG. 3 is a schematic illustration of a deflecting lens according to one embodiment.

FIG. 3 is a schematic illustration of a lens 300 according to one embodiment. Similar to FIG. 2, FIG. 3 includes an idealized representation of the components described herein, and the actual relationship and distribution of the various components with respect to one another may vary slightly while keeping within the scope of one or more embodiments described herein. The idealized representation shown in FIG. 3 is provided to illustrate and not to limit the scope of embodiments of the presently described invention, with the idealized representations shown and described in the original embodiments used as a starting point of the design. For example, the light entering the lens 300 in FIG. 3 is shown as being perfectly collimated, with all rays of light 308 being parallel to one another and illustrated in FIG. 3 as being horizontal. In this idealized representation, all rays of light 308 are focused by the lens at the focal point 310. The lens 300 may be used as one or more of the deflecting lenses 208 shown in FIG. 2. The lens 300 includes an outer diameter 306 that spans across the lens 300. The lens 300 has a focal length 302. As described above, the light emitted from the optical element 106 (shown in FIG. 1) may be emitted in the illumination cone 216 (shown in FIG. 2) that spans the illumination angle 218 (shown in FIG. 2). The size of the illumination cone 216 and the illumination angle 218 may be controlled by adjusting the focal length 302 and/or the outer diameter 306 of the lens 300. A divergence angle 304 of the lens 300 is the maximum angle at which light that is deflected by the lens 300 diverges from the focal point 310 located at the focal length 302. Increasing the divergence angle 304 by decreasing the focal length 302 and/or increasing the outer diameter 306 can increase the illumination angle 218 and the size of the illumination cone 216. Conversely, decreasing the divergence angle 304 by increasing the focal length 302 and/or decreasing the outer diameter 306 can decrease the illumination angle 218 and the size of the illumination cone 216. The divergence angle 304 is a function of the diameter 306 and focal length 302 of the lens 300. In this idealized representation, the relationship between the focal length 302, diameter 306 and divergence angle 304 of the lens 300 may be represented by:

$$\tan(\alpha) = d/(2f) \quad \text{(Eqn. 1)}$$

where $\alpha$ represents the divergence angle 304, d represents the diameter 306 and f represents the focal length 302.

Figure 4:
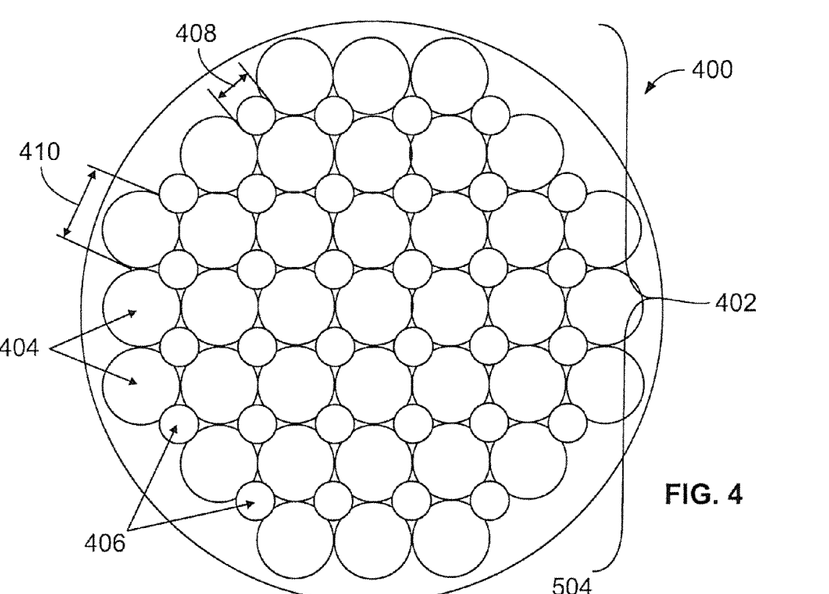
FIG. 4 is a plan view of an optical element according to another embodiment.

FIG. 4 is a plan view of an optical element 400 according to an alternative embodiment. The optical element 400 includes one or more components that are included in the optical element 106 shown in FIG. 1. For example, the optical element 400 includes an array 402 of deflecting lenses 404. The array 402 includes interstitial lenses 406 that are located between the deflecting lenses 404. The interstitial lenses 406 partially overlap the deflecting lenses 404 in the illustrated embodiment. Alternatively, the interstitial lenses 406 do not overlap the deflecting lenses 404 in another embodiment. The interstitial lenses 406 have a diameter 408 that is less than or equal to the outer diameters 410 of the deflecting lenses 404. The interstitial lenses 406 can have a divergence angle of deflected light that is the same as the deflecting lenses 404. For example, the interstitial lenses 406 receive and deflect the light collimated by the collimating lens 206 at a divergence angle that is approximately the same as the divergence angle of the deflecting lenses 404 in one embodiment. Alternatively, the divergence angle of the interstitial lenses 406 may differ from the divergence angle of the deflecting lenses 404. The interstitial lenses 406 may be included in the optical element 400 to increase the amount of light that is received and deflected by the array 402.

Figure 5:
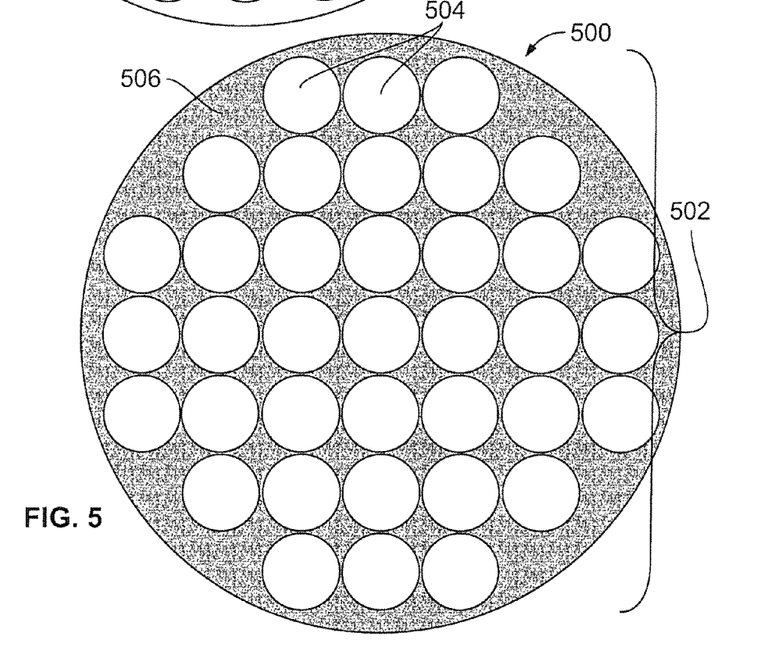
FIG. 5 is a plan view of an optical element according to another embodiment.

FIG. 5 is a plan view of an optical element 500 according to another embodiment. The optical element 500 is similar to one or more of the optical elements 106, 400 shown in FIGS. 1 and 4. For example, the optical element 500 includes an array 502 of deflecting lenses 504 similar to the array 210 (shown in FIG. 2) of the lenses 208 (shown in FIG. 2). The optical element 500 may include interstitial lenses (not shown) similar to the interstitial lenses 406 (shown in FIG. 4). While the term "similar" is used to compare the lenses, the lenses may have different properties. For example, the lenses may have different divergence angles. The optical element 500 includes a mask 506 disposed in one or more areas of the optical element 500 between the deflecting lenses 504. In embodiments where one or more interstitial lenses (not shown) are included in the array 502, the mask 506 may be disposed between the deflecting lenses 504 and/or the interstitial lenses. In one embodiment, the mask 506 includes, or is formed from, a reflective material. The mask 506 reflects at least a portion of the light emitted by the light source 200 (shown in FIG. 2) that is collimated by the collimating lens 206 but that is not received by the array 502 of deflecting lenses 504. For example, the mask 506 may reflect light that is not received by any of the deflecting lenses 504 back toward the light source 200. Reflecting this light back toward the light source 200 can increase the amount of light emitted by the light source 200 that is deflected by the array 502 of deflecting lenses 504. In another embodiment, the mask 506 includes, or is formed from, an opaque material that absorbs the light that is not received by the array 502 of the deflecting lenses 504. The mask 506 may partially absorb and partially reflect light that is not received by any of the deflecting lenses 504.

Figure 6:
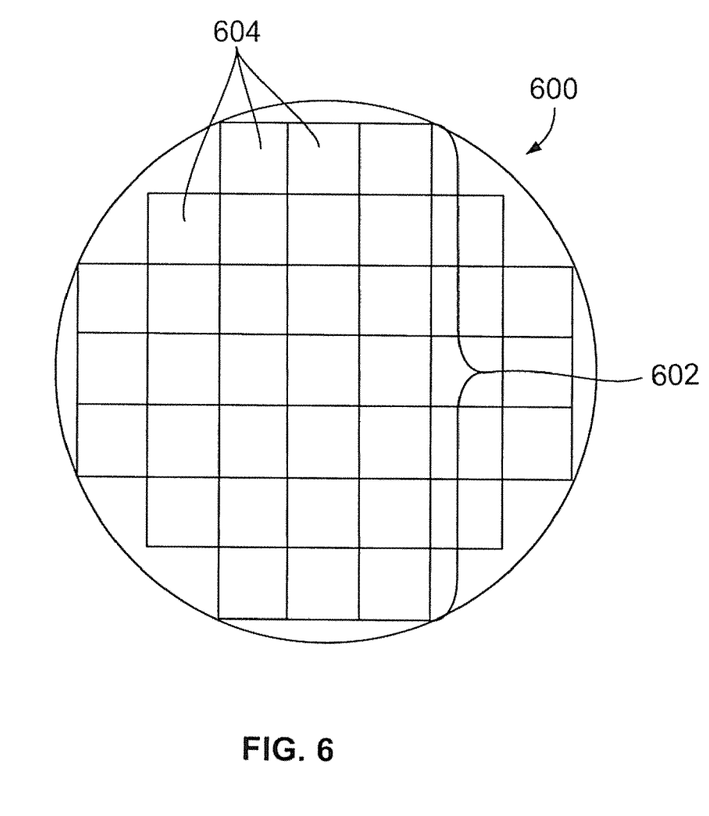
FIG. 6 is a plan view of an optical element according to another embodiment.

FIG. 6 is a plan view of an optical element 600 according to another embodiment. The optical element 600 is similar to one or more of the optical elements 106, 400, 500 shown in FIGS. 1, 4 and 5. For example, the optical element 600 includes an array 602 of square-shaped lenses 604 similar to the arrays 210, 402, 502 shown in FIGS. 2, 4 and 5 of the lenses 208, 404, 504 shown in FIGS. 2, 4 and 5.

Figure 7:
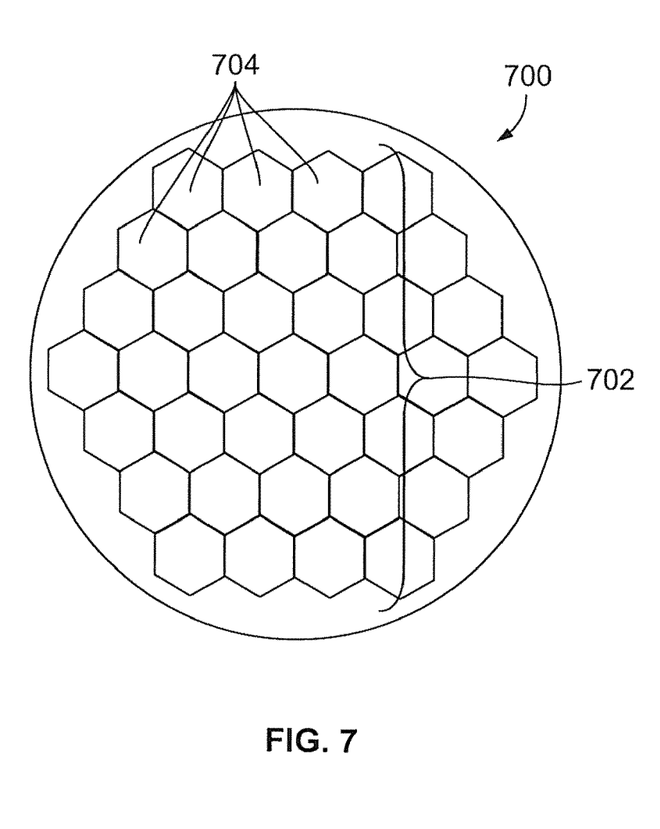
FIG. 7 is a plan view of an optical element according to another embodiment.

FIG. 7 is a plan view of an optical element 700 according to another embodiment. The optical element 700 is similar to one or more of the optical elements 106, 400, 500, 600 shown in FIGS. 1, 4, 5 and 6. For example, the optical element 700 includes an array 702 of hexagonal-shaped lenses 704 similar to the arrays 210, 402, 502, 602 shown in FIGS. 2, 4, 5 and 6 of the lenses 208, 404, 504, 604 shown in FIGS. 2, 4, 5 and 6. Polygon-shaped lenses such as the lenses 604, 704 may be used to increase the surface area of the optical element 600, 700 that receives light emitted from the light source 200 (shown in FIG. 2) and collimated by the collimating lens 206. While four- and six-sided polygon-shaped lenses 604, 704 are shown in FIGS. 6 and 7, other polygon-shaped lenses may be used in one or more other embodiments. Moreover, while circular and polygon-shaped lenses are described above, other shapes of the lenses may be used.

In one embodiment, the size of the lenses 208, 404, 504, 604, 704 (shown in FIGS. 2, 4, 5, 6 and 7) is reduced. As the outer diameter 306 is reduced, more of the lenses 208, 404, 504, 604, 704 can be placed on the upper surface of the optical element 106, 400, 500, 600, 700 and/or the lenses 208, 404, 504, 604, 704 may be placed closer together. Decreasing the size of the lenses 208, 404, 504, 604, 704 results in each of the lenses 208, 404, 504, 604, 704 receiving a smaller portion of the light that is collimated by the collimating lens 206 (shown in FIG. 2). Alternatively, decreasing the size of the lenses allows the size of the optical element 106, 400, 500, 600, 700 to be reduced, while maintaining the portion of the light that each deflecting lens 208, 404, 504, 604, 704 receives. Decreasing the size of the optical element 106, 400, 500, 600, 700 reduces the spatial separation between the different colors of light 806, 808, 810 (shown in FIG. 8) emitted from the optical element 802 (shown in FIG. 8).

Figure 8:
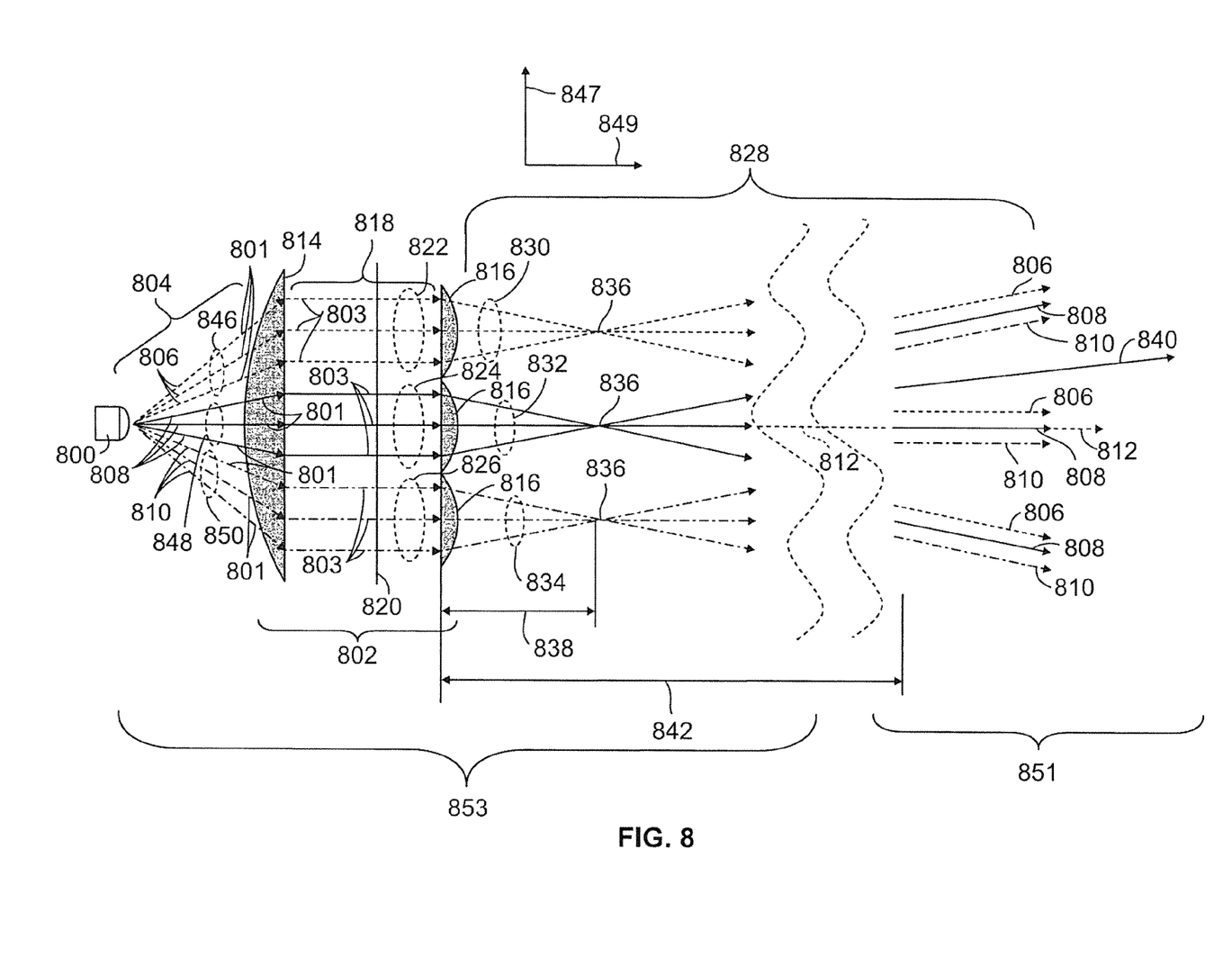
FIG. 8 is a schematic illustration of a light source and a color homogenizing optical element of the optical assembly shown in FIG. 1 according to one embodiment.

FIG. 8 is a schematic illustration of a light source 800 and a color homogenizing optical element 802 according to one embodiment, shown in a cross-sectional view. Similar to FIGS. 2 and 3, FIG. 8 includes an idealized representation of the components described herein, and the actual relationship and distribution of the various components with respect to one another may vary slightly while keeping within the scope of one or more embodiments described herein. The idealized representation shown in FIG. 8 is provided to illustrate and not to limit the scope of embodiments of the presently described invention, with the idealized representations shown and described in the original embodiments used as a starting point of the design. For example, the light source 800 illustrated in FIG. 8 is shown to emit light of three different colors 806, 808, 810.

In accordance with one or more embodiments described herein, the light source 800 may emit light of several different colors, and may emit light having a continuous distribution of colors based on the direction 202 (shown in FIG. 2) at which the light is emitted. As shown in FIG. 8, the light is emitted by the light source 800 in a variety of directions 801. The light source 800 is similar to the light source 200 (shown in FIG. 2) and/or the optical element 802 is similar to the optical element 106 (shown in FIG. 1) in one embodiment. As described above, the color of the light emitted by the light source 800 may be dependent on direction 801 of the light. For example, while an LED may emit a white light, the color of the light that is emitted in one or more of the directions 801 may be a non-white color, such as a blue, red or green color. FIG. 8 schematically illustrates the non-uniform distribution of colors from the light source 800, with a first portion 846 of the light including a first colored light 806, a second portion 848 of the light including a second colored light 808, and a third portion 850 of the light including third colored light 810. The different colored lights 806-810 are emitted in different directions 801. The light emitted by the light source 800 can include a different number of portions and/or colors. The portions 846, 848, 850 and the first, second and third colored light 806, 808, 810 are arranged in the angular emission pattern 804.

The different colored lights 806, 808, 810 in the angular emission pattern 804 are received by the optical element 802. In a manner similar to the optical element 106, the optical element 802 may include a collimating lens 814 and a plurality of deflecting lenses 816. While the collimating lens 814 is plano convex and each of the lenses 816 is plano-convex in FIG. 8, other types or shapes of lenses may be used for one or more of the collimating lens 814 and the lenses 816. For example, one or more of the collimating lens 814 and the lenses 816 may be a plano-concave-, biconcave-, biconvex-, plano-convex-, positive meniscus-, negative meniscus-, and the like, shaped lens. The collimating lens 814 receives and collimates the different colored lights 806, 808, 810 in the angular emission pattern 804. For example, the collimating lens 814 collimates the different colored lights 806, 808, 810 in a direction 803 that is substantially parallel to the optical axis 812. The collimating lens 814 converts the angular distribution of the different colored lights 806, 808, 810 in the angular emission pattern 804 into a spatial pattern 818. The spatial pattern 818 includes a distribution of the different colored lights 806, 808, 810 in a plane 820 that is perpendicular to the optical axis 812.

The lenses 816 may be arranged in an array similar to as described above. Each of the lenses 816 in the optical element 802 receives a portion 822, 824, 826 of the different colored lights 806, 808, 810 in the spatial pattern 818. For example, a top one of the lenses 816 receives the portion 822 of the first colored light 806, a middle one of the lenses 816 receives the portion 824 of the second colored light 808, and a bottom one of the lenses 816 receives the portion 826 of the third colored light 810. While each of the lenses 816 is illustrated in FIG. 8 as receiving a different colored light 806, 808, 810, the lenses 816 may each receive less than all of the light of a particular colored light 806, 808, 810. For example, the lenses 816 may be sufficiently large and/or positioned to receive more than a single colored light 806, 808, 810. Conversely, the lenses 816 may each receive a portion of a particular colored light 806, 808, 810, with additional lenses receiving the rest of the light of the same colored light 806, 808, 810. For example, the lenses 816 may be sufficiently small such that a plurality of the lenses 816 receives one of the colored lights 806, 808, 810.

In one embodiment, the lenses 816 include refractive lenses that refract the different colored light 806, 808, 810 in the spatial pattern 818 into an illumination pattern 828. For example, each of the lenses 816 may refract the portion 822, 824, 826 of the different colored light 806, 808, 810 received by the corresponding lens 816 into a portion 830, 832, 834 of the illumination pattern 828. Alternatively, the lenses 816 may include diffractive lenses that diffract the portions 822, 824, 826 of light into the portions 830, 832, 834 of the illumination pattern 828. While the discussion herein refers to the lenses 816 deflecting the different colored light 806, 808, 810, other embodiments may otherwise divert or direct the otherwise different colored light 806, 808, 810 in the spatial pattern 818 into the portions 822, 824, 826 in the illumination pattern 828. As shown in FIG. 8, the top lens 816 deflects the portion 822 of the first colored light 806 in the spatial pattern 818 into the portion 830 of the illumination pattern 828; the middle lens 816 deflects the portion 824 of the second colored light 808 in the spatial pattern 818 into the portion 832 of the illumination pattern 828; and the bottom lens 816 deflects the portion 826 of the third colored light 810 in the spatial pattern 818 into the portion 834 of the illumination pattern 828.

In the illustrated embodiment, each of the different colored lights 806, 808, 810 in the corresponding portions 830, 832, 834 is deflected toward a focal point 836 of each lens 816. The focal point 836 is located away from the lens 816 by a focal length 838 of the lens 816. In one embodiment, each of the lenses 816 includes approximately the same focal length 838. Alternatively, the lenses 816 may have focal lengths that are not all equal.

The different colored lights 806, 808, 810 that are emitted by the light source 800 are mixed together in the illumination pattern 828. For example, the different colored lights 806, 808, 810 emitted by the light source 800 are mixed together by the optical element 802. In the illustrated embodiment, the different colored lights 806, 808, 810 emitted by the light source 800 are mixed together such that the color of the light is substantially uniform at a distance 842 from the optical element 802. In FIG. 8 the distances along vertical and horizontal directions 847, 849 in the right portion 851 of FIG. 8 have been scaled down with respect to the distances along the vertical and horizontal directions 847, 849 in the left portion 853 of FIG. 8 by 1:6. The color of the light emanating from the optical element 802 may be substantially independent of the initial distribution of the different colored lights 806, 808, 810 that is emitted by the light source 800. The distance 842 is greater than the focal length 838 of the lenses 816 in one embodiment. Alternatively, the distance 842 may be sufficiently large such that the color of the light is independent of the direction 840 at which light emanates from the optical element 802. Distances from the optical element 802 that are greater than the distance 842 may be referred to as the far field of the optical element 802. The color of the light 806-810 may be independent of the direction 203 (shown in FIG. 2) at which the light 806-810 emanates from the optical element 802. For example, the light in the illumination pattern 828 may include a mixture of the different colored lights 806, 808, 810 emitted by the light source 800 throughout various directions 203 at which the light 806-810 emanates from the optical element 802. The optical element 802 receiving and mixing the light emitted by the light source 800 thus smoothes out, or reduces, the angular distribution of color of the light in one embodiment.

Figure 9:
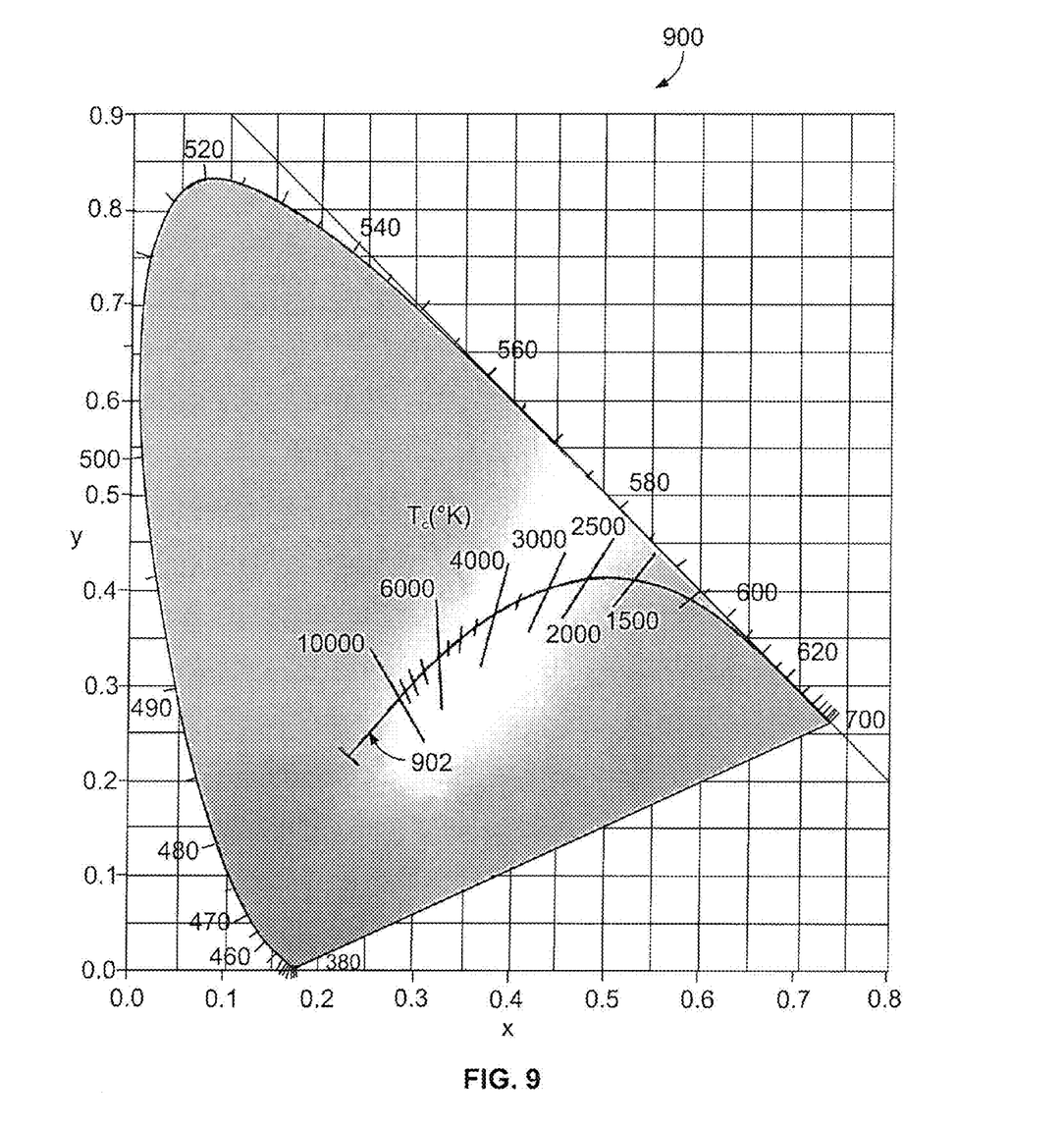
FIG. 9 is a grayscale version of the International Commission on Illumination's ("CIE") 1931 color space chromaticity diagram with the Planckian Locus shown in the diagram.

FIG. 9 is a grayscale version of the CIE 1931 color space chromaticity diagram 900 with the Planckian Locus 902 shown in the diagram 900. The color(s) of the light emitted by the light source 200, 800 (shown in FIGS. 2 and 8) may be specified by x, y coordinates in the CIE 1931 color space chromaticity diagram 900. For example, a "white point," or point at which the color on the CIE 1931 color space chromaticity diagram 900 is white, occurs at coordinates x=⅓ and y=⅓. Other colors are defined by other coordinates in the CIE 1931 color space chromaticity diagram 900.

Additional colors at coordinates other than x=⅓ and y=⅓ also are considered to be "white" colors. These colors lie on one or more points near or along the Planckian Locus 902. In one embodiment, the Planckian Locus 902 defines the coordinates on the CIE 1931 color space chromaticity diagram 900 of the colors of light emitted by a black body radiator (not shown) for various temperatures. The temperature of the black body radiator is numerically displayed at points along the Planckian Locus 902 and is referred to as the correlated color temperature ("CCT") of the black body radiator.

Figure 10:
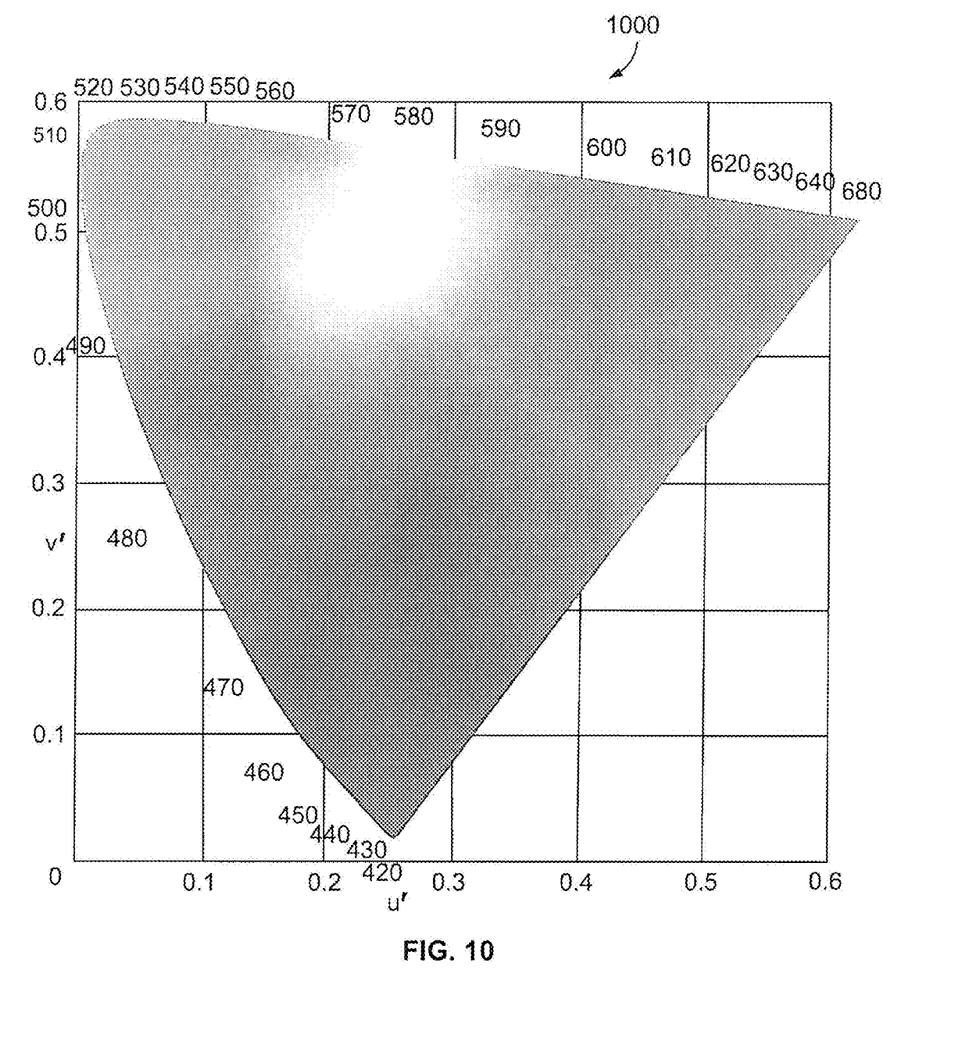
FIG. 10 is a grayscale version of the CIE 1976 color space chromaticity diagram.

FIG. 10 is a grayscale version of the CIE 1976 color space chromaticity diagram 1000. Similar to the CIE 1931 color space chromaticity diagram 900, the color(s) of the light emitted by the light source 200, 800 (shown in FIGS. 2 and 8) may be specified by u', v' coordinates in the CIE 1976 color space chromaticity diagram 1000. For example, a "white point," or point at which the color on the CIE 1976 color space chromaticity diagram 1000 is white, may occur at coordinates u'=0.2105 and v'=0.4737. Other colors are defined by other coordinates in the CIE 1976 color space chromaticity diagram 1000.

Figure 11:
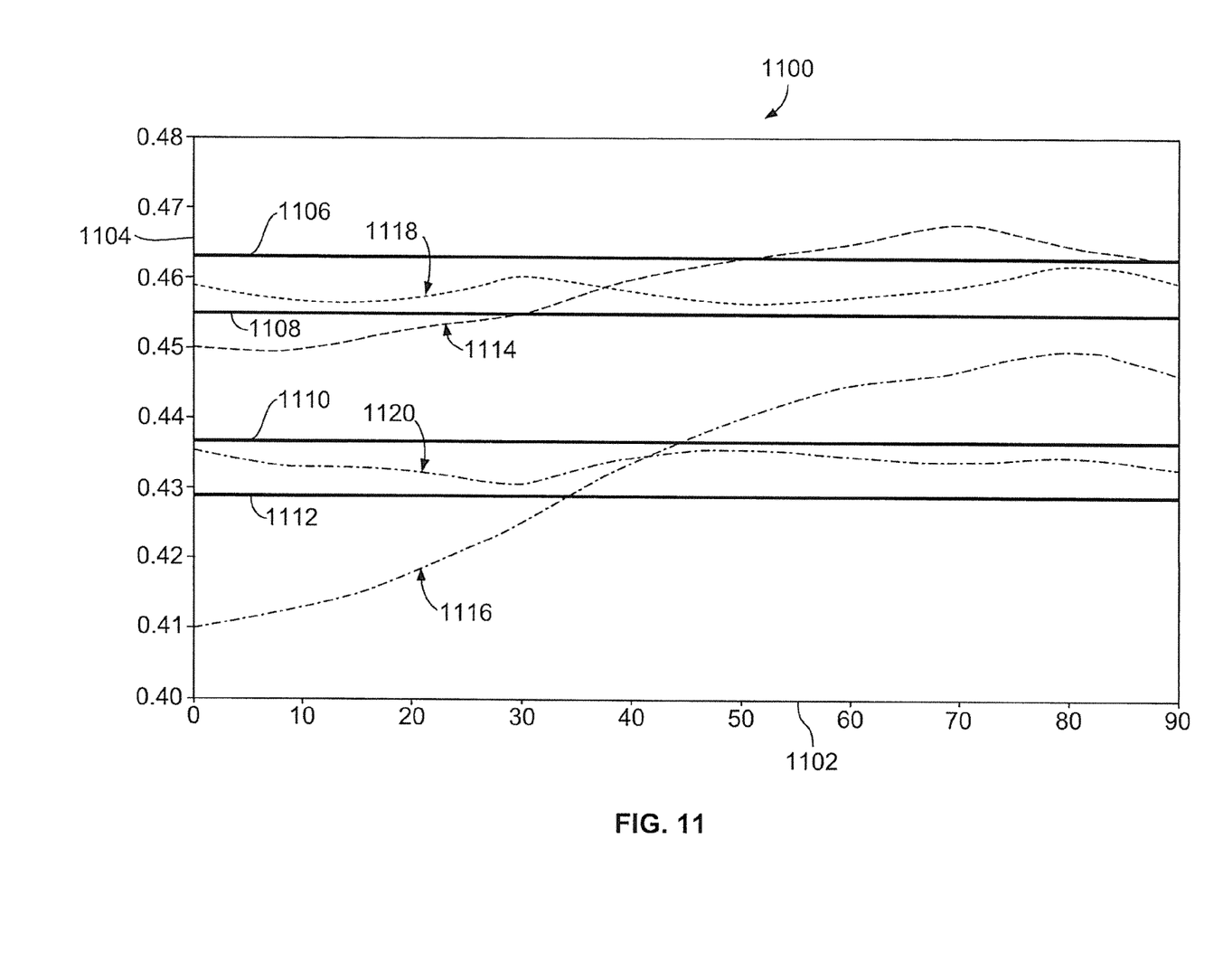
FIG. 11 is a graphical representation of a dependence of the color of light emitted by a light source with and without the optical element shown in FIG. 8 according to one embodiment.

With continued reference to FIG. 8, FIG. 11 is a graphical representation 1100 of the dependence of the color of light emitted by a light source on the direction of the light with and without the optical element 802 according to one embodiment. As described above, the light source 800 emits different colored lights 806, 808, 810 in the angular emission pattern 804 such that the color of the light is a function of the direction 202 (shown in FIG. 2) of the light. A horizontal axis 1102 represents various directions 202 of the light. The directions 202 are expressed as the zenith angles 204 (shown in FIG. 2) of the directions 202 and are expressed in degrees. For example, a direction 202 of zero degrees on the left end of the horizontal axis 1102 represents a zenith angle 204 of the direction 202 that is approximately parallel to the optical axis 812, while a direction 202 of ninety degrees on the right end of the horizontal axis 1102 represents a zenith angle 204 that is approximately perpendicular to the optical axis 812. A vertical axis 1104 represents various values of the x and y coordinates on the CIE 1931 color space chromaticity diagram 900 (shown in FIG. 9). The values of the x and y coordinates shown for each direction 202 may be for a single azimuth angle 220 (shown in FIG. 2) for the directions 202 shown. Alternatively, the values of the x and y coordinates shown for each direction 202 may be the average of the x and y coordinates for all azimuth angles 220 for each direction 202. Alternatively, the vertical axis 1104 may represent various values of the u', v' coordinates in the CIE 1976 color space chromaticity diagram 1000 (shown in FIG. 10). While the vertical axis 1104 extends between values of 0.40 and 0.48, other values may be used.

A plurality of x specification limits 1106, 1108 define upper and lower limits for the x coordinate on the CIE 1931 color space chromaticity diagram 900 (shown in FIG. 9) for light emitted by the light source 800. A plurality of y specification limits 1110, 1112 define upper and lower limits for the y coordinate on the CIE 1931 color space chromaticity diagram 900 for light emitted by the light source 800. The y specification limits 1110, 1112 may be the same for all azimuth angles 220 (shown in FIG. 2). Alternatively, the y specification limits 1110, 1112 may represent a plurality of limits expressed in the u', v' coordinates of the CIE 1976 color space chromaticity diagram 1000 (shown in FIG. 10). For example, the Energy Star® program may establish u' and v' limits for a solid state lighting luminary such as an LED. The x and y specification limits 1106, 1108, 1110, 1112 or the u' and v' limits may be established so that the light emanating from the optical element 802 appears to be a particular color independent of the direction 203 (shown in FIG. 2) of the light.

As described above, the optical element 802 receives light having a color that is dependent on the direction 202 the light is emitted from the light source 800 and emits light that has a color that is less dependent on the direction 203 the light emanates from the optical element 802. Each of emission x and y curves 1114, 1116 represents the values of the x and y coordinates, respectively, on the CIE 1931 color space chromaticity diagram 900 (shown in FIG. 9) for the color of light emitted by the light source 800 without the optical element 802. For example, the emission curves 1114, 1116 represent the dependence of the color of the light on the direction 202 of the light emitted by the light source 800 without the optical element 802. As shown in FIG. 11, some values of the x and y coordinates in the emission curves 1114, 1116 fall outside of the x and y specification limits 1106, 1108, 1110, 1112 for a majority of the angles 1102. Thus, the color of the light emitted by the light source 800 does not meet the color requirements set by the x and y specification limits 1106, 1108, 1110, 1112 for some of the directions 202 at which the light is emitted by the light source 800.

Each of homogenized x and y curves 1118, 1120 represents the values of the x and y coordinates, respectively, on the CIE 1931 color space chromaticity diagram 900 (shown in FIG. 9) for the color of light emitted by the light source 800 and received by and emitted from the optical element 802. For example, the homogenized x and y curves 1118, 1120 represent the decreased dependence of the color of the light on the direction 203 the light emanates from the optical element 802. As shown in FIG. 11, the values of the x and y coordinates in the homogenized x and y curves 1118, 1120 are less dependent on the direction 203 of the light than the dependence of the x and y coordinates on the direction 202 of the light in the emission curves 1114, 1116. For example, values of the x and y coordinates in the homogenized x and y curves 1118, 1120 remain within the x and y specification limits 1106, 1108, 1110, 1112 for the angles 1102 of the light emanating from the optical element 802 shown in FIG. 8. The color of the light is therefore substantially independent of the direction 203 the light emanates from the optical element 802. As a result, the color of the light generated by the light source 800 and mixed by the optical element 802 meets or exceeds the color requirements set by the x and y specification limits 1106, 1108, 1110, 1112. Also as shown in FIG. 11, the variance of the x and y values for the color of the light emitted by the light source 800 without the optical element 802 (for example, the emission curves 1114, 1116) is greater than the variance of the x and y values for the color of the light emitted by the light source 800 and passing through the optical element 802 (for example, the homogenized x and y curves 1118, 1120) in one embodiment.

Figure 12:
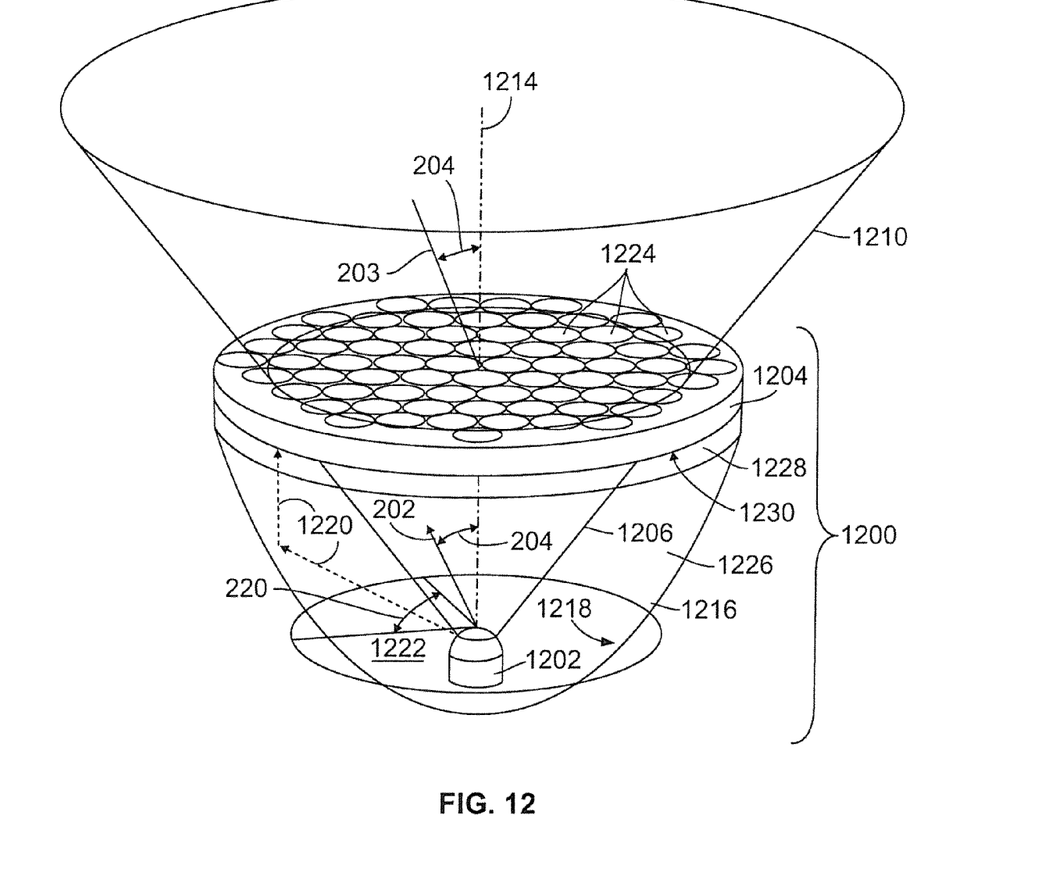
FIG. 12 is a schematic illustration of an optical assembly according to another embodiment.

FIG. 12 is a schematic illustration of an optical assembly 1200 according to another embodiment. Similar to FIGS. 2, 3, and 8, FIG. 12 includes an idealized representation of the components described herein, and the actual relationship and distribution of the various components with respect to one another may vary slightly while keeping within the scope of one or more embodiments described herein. The idealized representation shown in FIG. 12 is provided to illustrate and not to limit the scope of embodiments of the presently described invention, with the idealized representations shown and described in the original embodiments used as a starting point of the design. Similar to the optical assembly 100 shown in FIG. 1, the optical assembly 1200 includes a light source 1202 and an optical element 1204. The light source 1202 is similar to the light source 200 (shown in FIG. 2) and the optical element 1204 is similar to the optical element 106 (shown in FIG. 1) in one embodiment. For example, the light source 1202 may emit light along an optical axis 1214 in an angular emission pattern 1206, with the color of the light in the angular emission pattern 1206 having a dependence on the direction 202 of the light, as described above. The direction 202 may be expressed as an azimuth angle 220 and a zenith angle 204. The optical element 1204 receives the light and emits the light in an illumination pattern 1210, with the color of the light in the illumination pattern 1210 having a dependence on the direction 203 of the light that is less than the dependence of the color of the light on the direction 202 in the angular emission pattern 1206.

The optical assembly 1200 includes a reflector element 1216 that at least partially surrounds the light source 1202. The reflector element 1216 is shown in cross-sectional form in FIG. 12. An inside surface 1218 of the reflector element 1216 can include, or be formed of, a reflective material. In one embodiment, the reflector element 1216 includes a reflectively coated surface 1218. In another embodiment, the surface 1218 reflects light because the surface 1218 is the boundary between two materials that have different indices of retraction. The reflector element 1216 reflects light that is emitted from the light source 1202 at large angles 204 from the optical axis 1214 toward the optical element 1204. For example, the reflector element 1216 reflects light that is not emitted toward the optical element 1204. By way of example only, if a beam 1220 of light is emitted by the light source 1202 in a direction that is not into the optical element 1204, the beam 1220 may be reflected by the reflector element 1216 one or more times so that the beam 1220 is directed into the optical element 1204.

The shape of the inside surface 1218 is such that light emitted by the light source 1202 toward the inside surface 1218 is reflected toward the optical element 1204 such that the light received by the optical element 1204 is at least partially collimated. In such an embodiment, the optical element 1204 may not include a collimating lens. For example, the optical element 1204 may only include one or more lenses 1224 arranged in an array that deflect the light in a manner similar to the lenses 208 (shown in FIG. 2).

The reflector element 1216 defines an interior chamber 1222 in which the light source 1202 may be disposed. The interior chamber 1222 may include a transmissive material 1226. For example, the interior chamber 1222 may be a vacuum or be filled with a solid, liquid, or gas. For example, the interior chamber 1222 may be filled with a glass or plastic and may have a gap 1228 between the reflector element 1216 and the optical element 1204. In one embodiment, the gap 1228 is at least partially filled with air or a material that is different from the material 1226 in the interior chamber 1222. The optical element 1204 may not include a lens on a bottom surface 1230 of the optical element 1204 if the index of refraction of the optical element 1204 is the same as, or approximately the same as, the index of refraction of the material which is in contact with the optical element. For example, a collimating lens such as the collimating lens 206 (shown in FIG. 2) may not be provided on the bottom surface 1230 if the optical element 1204 has approximately the same index of refraction as the material 1226 in the interior chamber 1222 and if the shape of the surface 1218 reflects light from the light source 1202 in such a way that the light is at least partially collimated prior to being received by the optical element 1204. Alternatively, the optical element 1204 may include a collimating lens on the bottom surface 1230 if the index of refraction of the optical element 1204 differs from the index of refraction of the material in the interior chamber 1222 or of the material in the gap 1228.

Figure 13:
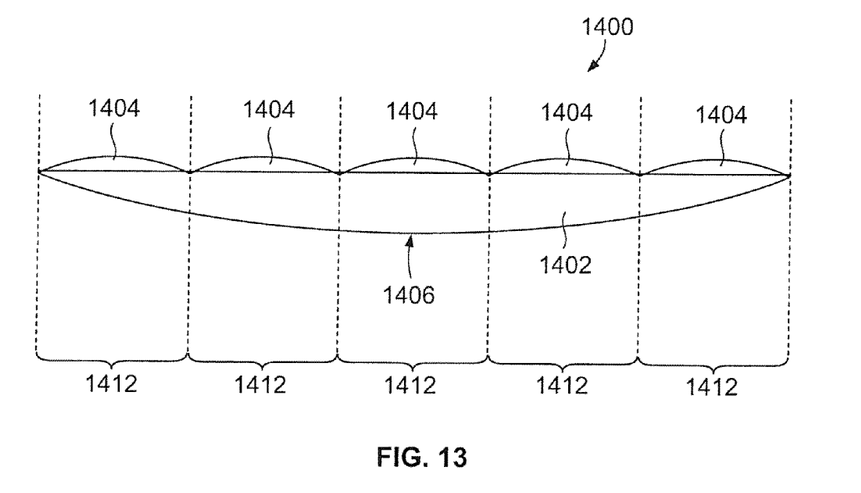
FIG. 13 is a schematic illustration of an optical assembly according to an alternative embodiment.

FIG. 13 is a schematic illustration of an optical assembly 1400 according to an alternative embodiment, in a cross-sectional view. The optical assembly 1400 includes and combines the functionality of a collimating lens 1402 and a plurality of deflecting lenses 1404 by forming the collimating and deflecting lenses 1402, 1404 as a unitary body. For example, the collimating and deflecting lenses 1402, 1404 may be homogeneously formed with one another. Alternatively, the collimating and deflecting lenses 1402, 1404 are separately formed and joined together. The deflecting lenses 1404 may be arranged in an array as described above. The collimating lens 1402 includes a continuous curved surface 1406 that receives the light emitted by a light source (not shown).

The optical assembly 1400 receives light having a distribution of colors that is a function of, or is dependent upon, the direction of the light, deflects and emits the light so that the light emitted from the optical assembly 1400 has a more uniform distribution of color. For example, the optical assembly 1400 may receive, deflect and emit light in a manner similar to the optical assemblies described herein, including the optical assemblies 106 (shown in FIG. 1) and 802 (shown in FIG. 8). Specifically, the collimating lens 1402 collimates light that is incident on the collimating lens 1402 from a light source (not shown). The incident light has a non-uniform distribution of colors that is a function of an emission direction 202 (shown in FIG. 2). Each of several portions 1412 of the collimating lens 1402 receives a portion of the incident light and corresponds to one of the deflecting lenses 1404. For example, the portions 1412 illustrated in FIG. 13 may correspond to the circular shape of the lenses 1404 and may encompass a cylindrical shape in three dimensions. Each portion 1412 collimates the light that is received by that portion 1412. The collimated light from each portion 1412 is then received by a corresponding lens 1404 before being deflected by the deflecting lenses 1404. The deflecting lenses 1404 deflect the light so that the light emitted from the deflecting lenses 1404 has a more uniform distribution of color, as described above.

Figure 14:
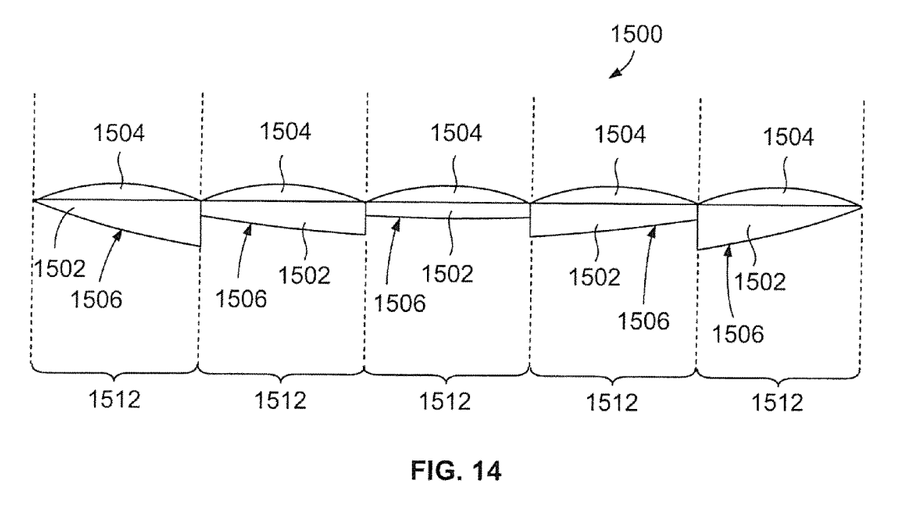
FIG. 14 is a schematic illustration of an optical assembly according to an alternative embodiment.

FIG. 14 is a schematic illustration of an optical assembly 1500 according to an alternative embodiment, in a cross-sectional view. The optical assembly 1500 includes and combines the functionality of collimating lens elements 1502 and a plurality of deflecting lenses 1504 by forming the collimating and deflecting lenses 1502, 1504 as a unitary body. For example, the collimating and deflecting lenses 1502, 1504 may be homogeneously formed with one another. Alternatively, the collimating and deflecting lenses 1502, 1504 are separately formed and joined together. The deflecting lenses 1504 may be arranged in an array as described above. Each of the collimating lens elements 1502 includes a continuous curved surface 1506 that receives the light emitted by a light source (not shown).

The optical assembly 1500 receives light having a distribution of colors that is a function of, or is dependent upon, the direction of the light, deflects and emits the light so that the light emitted from the optical assembly 1500 has a more uniform distribution of color. For example, the optical assembly 1500 may receive, deflect and emit light in a manner similar to the optical assemblies described herein, including the optical assemblies 106 (shown in FIG. 1) and 802 (shown in FIG. 8). Specifically, the collimating lens elements 1502 collimate light that is incident on the collimating lens elements 1502 from a light source (not shown). The incident light has a non-uniform distribution of colors that is a function of an emission direction 202 (shown in FIG. 2). Each of several portions 1512 of the optical assembly 1500 receives a portion of the incident light and corresponds to one of the deflecting lenses 1504 and one of the collimating lens elements 1502. For example, the portions 1512 illustrated in FIG. 14 may correspond to the circular shape of the lenses 1504 and may encompass a cylindrical shape in three dimensions. Each collimating lens element 1502 collimates the light that is received by that portion 1512. The collimated light from each portion 1512 is then received and deflected by a corresponding deflecting lens 1504. The deflecting lenses 1504 deflect the light so that the light emitted from the optical element 1500 has a more uniform distribution of color, as described above.

In one embodiment, the collimating lens elements 1502 can include a substantially planar surface instead of the curved surface 1506. A substantially planar surface of the collimating lens elements 1502 can reduce the cost and complexity of manufacturing the collimating lens elements 1502.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and merely are example embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. An optical assembly comprising:
a light source having an optical axis and configured to emit light, where a color of the light varies based on a direction the light is emitted from the light source;
an optical element positioned transverse to the optical axis and configured to mix the light, the optical element including a unitary body that has a collimating lens and a plurality of deflecting lenses disposed on opposite sides of the unitary body, wherein the color of the light mixed by the optical element is independent of a direction at which the light emanates from the optical element;
a reflector defining an interior chamber in which the light source is disposed, the reflector configured to reflect at least a first portion of the light generated by the light source toward the optical element, wherein the interior chamber is filled with a light transmissive material that is separate from the optical element and having an equivalent index of refraction as the collimating lens; and
a mask disposed between the deflective lenses of the optical element, the mask configured to reflect at least a second portion of the light that is emitted from the light source back toward the light source and the reflector.

2. The optical assembly of claim 1, wherein the optical element collimates and deflects the light generated by the light source to homogenize the color of the light emanating from the optical element.

3. The optical assembly of claim 1, wherein the collimating lens of the optical element is disposed between the light source and the plurality of deflecting lenses.

4. The optical assembly of claim 1, wherein the deflecting lenses are arranged in a regular pattern in an array.

5. The optical assembly of claim 1, wherein the collimating lens comprises a plurality of lens elements each including a portion of a curved surface of the collimating lens, each of the lens elements disposed opposite at least one of the deflecting lenses.

6. The optical assembly of claim 5, wherein the lens elements of the collimating lens are disposed side-by-side in directions that are transverse to the optical axis of the light source.

7. The optical assembly of claim 1, wherein the mask is configured to prevent the at least the second portion of the light generated by the light source from emanating from the optical element by reflecting the at least some of the light back toward the light source and the reflector.

8. The optical assembly of claim 1, wherein a chromaticity of the color of the light emitted by the light source is more dependent on a zenith angle along which the light is emitted than a chromaticity of the color of the light emanating from the optical element.

9. The optical assembly of claim 1, wherein the light source is enclosed in the light transmissive material in the interior chamber of the reflector.

10. An optical assembly comprising:
- an element defining an interior chamber;
- a light source disposed in the interior chamber defined by the element and generating light in an angular emission pattern relative to an optical axis of the light source, a color of the light in the angular emission pattern varying based on a direction the light is emitted from the light source;
- a unitary lens body joined to the element that defines the interior chamber such that the light source is disposed between the unitary lens body and the element, the unitary lens body including a collimating lens and a plurality of deflecting lenses disposed on opposite sides of the unitary lens body, the collimating lens receiving the light from the angular emission pattern and collimating the light into a spatial pattern in a plane transverse to the optical axis, the deflecting lenses arranged in an array in a plane transverse to the optical axis, each of the deflecting lenses receiving a portion of the light in the spatial pattern, wherein the deflecting lenses mix the light into an illumination pattern that emanates from the deflecting lenses, a color of the light in the illumination pattern being independent of a direction the light emanates from the deflecting lenses; and
- a mask disposed between the deflecting lenses, the mask preventing at least a portion of the light in the angular emission pattern from emanating from the deflecting lenses by reflecting the portion of the light back toward the light source and the element that defines the interior chamber.

11. The optical assembly of claim 10, wherein the collimating and deflecting lenses are homogeneously formed on opposing sides of the unitary lens body.

12. The optical assembly of claim 10, wherein the element that defines the interior chamber is a reflector element configured to reflect at least some of the light generated by the light source toward the collimating lens.

13. The optical assembly of claim 10, wherein a chromaticity of the color of the light emitted by the light source is more dependent on a zenith angle along which the light is emitted than a chromaticity of the color of the light emanating from the optical element.

14. The optical assembly of claim 10, wherein the light source is disposed inside the optical assembly.

\* \* \* \* \*